United States Patent
Linnenkohl

(10) Patent No.: US 11,162,559 B2
(45) Date of Patent: Nov. 2, 2021

(54) BELT DRIVE COMPRISING DRIVING ELEMENTS

(71) Applicant: GEBR. BODE GMBH & CO. KG, Kassel (DE)

(72) Inventor: Lars Linnenkohl, Kassel (DE)

(73) Assignee: GEBR. BODE GMBH & CO. KG, Kassel (DE)

( * ) Notice: Subject to any disclaimer, the term of this patent is extended or adjusted under 35 U.S.C. 154(b) by 340 days.

(21) Appl. No.: 16/083,964

(22) PCT Filed: Mar. 17, 2017

(86) PCT No.: PCT/EP2017/056400
§ 371 (c)(1),
(2) Date: Sep. 11, 2018

(87) PCT Pub. No.: WO2017/158162
PCT Pub. Date: Sep. 21, 2017

(65) Prior Publication Data
US 2020/0325960 A1    Oct. 15, 2020

(30) Foreign Application Priority Data
Mar. 18, 2016   (DE) .................. 20 2016 001 776.5

(51) Int. Cl.
| | |
|---|---|
| *F16G 1/28* | (2006.01) |
| *F16H 7/02* | (2006.01) |
| *F16H 7/18* | (2006.01) |
| *F16H 55/17* | (2006.01) |

(52) U.S. Cl.
CPC ............... *F16G 1/28* (2013.01); *F16H 7/023* (2013.01); *F16H 7/18* (2013.01); *F16H 55/171* (2013.01)

(58) Field of Classification Search
CPC . F16G 1/28; F16H 7/023; F16H 55/30; B65G 23/06; B65G 17/08
USPC .................................................... 474/152, 153
See application file for complete search history.

(56) References Cited

U.S. PATENT DOCUMENTS

| | | | | |
|---|---|---|---|---|
| 512,822 | A * | 1/1894 | Hoeft ...................... | F16H 55/30 474/163 |
| 618,083 | A * | 1/1899 | Gentry .................... | F16H 7/023 474/153 |
| 2,551,578 | A * | 5/1951 | Bendall ................... | F16G 13/02 474/153 |

(Continued)

FOREIGN PATENT DOCUMENTS

| | | |
|---|---|---|
| DE | 3233891 C1 | 12/1983 |
| DE | 3312615 A1 | 10/1984 |

(Continued)

OTHER PUBLICATIONS

International Search Report dated Jun. 27, 2017 re: Application No. PCT/EP2017/056400, pp. 1-2, citing: DE 32 33 891 C1 and DE 33 12 615 A1.

*Primary Examiner* — Henry Y Liu
(74) *Attorney, Agent, or Firm* — Cantor Colburn LLP

(57) ABSTRACT

A toothed-belt drive includes a toothed belt, at least one driving element attached to the toothed belt, and a toothed disk with tooth recesses for driving teeth of the toothed belt and driving element recesses for driving the at least one driving element. The driving element forms a connecting element that can be connected to an element to be driven.

10 Claims, 2 Drawing Sheets

(56) References Cited

U.S. PATENT DOCUMENTS

| | | | | |
|---|---|---|---|---|
| 2,627,756 A * | 2/1953 | Bendall | F16G 1/28 | 474/153 |
| 3,026,737 A * | 3/1962 | Berg | F16H 55/30 | 474/153 |
| 3,313,167 A * | 4/1967 | Wiese | F16H 55/10 | 474/153 |
| 3,338,107 A * | 8/1967 | Kiekhaefer | F16H 7/023 | 474/153 |
| 3,472,563 A * | 10/1969 | Irgens | B62D 55/125 | 305/112 |
| 3,575,474 A * | 4/1971 | Russ, Sr. | B62D 55/12 | 305/165 |
| 3,888,132 A * | 6/1975 | Russ, Sr. | F16G 1/28 | 474/153 |
| 3,948,110 A * | 4/1976 | Lassanske | B62D 55/12 | 305/178 |
| 3,977,265 A * | 8/1976 | Worley | F16G 1/28 | 474/153 |
| 3,983,762 A * | 10/1976 | Dellner | B65G 39/07 | 198/834 |
| 4,027,587 A * | 6/1977 | Tschinkel | B41J 1/20 | 101/111 |
| 4,072,062 A * | 2/1978 | Morling | A01D 45/023 | 198/494 |
| 4,087,136 A * | 5/1978 | Boggs | B62D 55/0963 | 267/182 |
| 4,148,225 A * | 4/1979 | Redmond, Jr. | F16H 7/023 | 474/148 |
| RE30,018 E * | 6/1979 | Clemens | B62D 55/12 | 474/152 |
| 4,174,642 A * | 11/1979 | Martin | F16H 55/30 | 474/152 |
| 4,218,932 A * | 8/1980 | McComber | F16H 7/023 | 180/9.62 |
| 4,473,364 A * | 9/1984 | Roling | F16H 55/303 | 474/164 |
| 4,501,577 A * | 2/1985 | Roling | F16H 55/303 | 474/155 |
| 4,509,936 A * | 4/1985 | Muller | A01D 45/023 | 474/148 |
| 4,634,409 A * | 1/1987 | Johnson | F16G 1/28 | 474/152 |
| 4,687,261 A * | 8/1987 | Atkin | B62D 55/24 | 305/115 |
| 4,705,469 A * | 11/1987 | Liebl | A44B 17/0035 | 249/122 |
| 4,734,087 A * | 3/1988 | Takano | F16G 5/166 | 474/270 |
| 4,804,353 A * | 2/1989 | Wenman | F16H 55/303 | 474/152 |
| 4,950,212 A * | 8/1990 | Masuda | F16G 5/166 | 474/242 |
| 5,006,096 A * | 4/1991 | Breher | F16G 1/28 | 474/153 |
| 5,012,263 A * | 4/1991 | Tull | B65G 23/06 | 396/479 |
| 5,013,286 A * | 5/1991 | Breher | F16G 1/28 | 474/153 |
| 5,021,033 A * | 6/1991 | Sundstrom | B27B 17/08 | 474/152 |
| 5,041,063 A * | 8/1991 | Breher | F16G 1/28 | 474/205 |
| 5,230,665 A * | 7/1993 | Tanaka | B64G 9/00 | 474/153 |
| 5,346,439 A * | 9/1994 | Lynch | F16G 1/28 | 474/205 |
| 5,443,425 A * | 8/1995 | Korenberg | F16H 55/52 | 474/163 |
| 5,484,321 A * | 1/1996 | Ishimoto | F16H 7/023 | 446/433 |
| 5,662,541 A * | 9/1997 | Roovers | F16G 1/28 | 474/149 |
| 5,980,406 A * | 11/1999 | Mott | F16H 7/06 | 474/152 |
| 5,993,345 A * | 11/1999 | Mott | F16G 1/22 | 474/201 |
| 6,102,823 A * | 8/2000 | Hosokawa | F16G 5/166 | 474/242 |
| 6,317,989 B1 * | 11/2001 | Forsberg | B27B 17/08 | 30/384 |
| 6,425,479 B1 * | 7/2002 | Guldenfels | B65G 17/08 | 198/834 |
| 6,516,944 B2 * | 2/2003 | Guldenfels | B65G 17/08 | 198/850 |
| 6,766,899 B1 * | 7/2004 | Guldenfels | B65G 17/08 | 198/834 |
| 7,625,050 B2 * | 12/2009 | Bair | B62D 55/24 | 305/169 |
| 7,841,463 B2 * | 11/2010 | DeGroot | B65G 15/64 | 198/835 |
| 7,850,562 B2 * | 12/2010 | DeGroot | B65G 15/26 | 474/153 |
| 7,901,311 B2 * | 3/2011 | Di Giacomo | F16H 7/023 | 474/148 |
| 7,980,956 B2 * | 7/2011 | Kneeshaw | F16D 3/52 | 464/49 |
| 8,776,989 B2 * | 7/2014 | Guldenfels | B08B 3/02 | 198/495 |
| 8,888,631 B2 * | 11/2014 | Morita | F16H 55/30 | 474/153 |
| 9,115,802 B2 * | 8/2015 | Guldenfels | B08B 3/02 | |
| 9,643,788 B2 * | 5/2017 | Steinert | F16G 1/28 | |
| 2004/0222072 A1 * | 11/2004 | Verdigets | F16H 55/06 | 198/834 |
| 2008/0190462 A1 * | 8/2008 | Guldenfels | F16H 55/30 | 134/44 |
| 2009/0000921 A1 * | 1/2009 | Guldenfels | B65G 23/06 | 198/834 |
| 2009/0050185 A1 * | 2/2009 | Guldenfels | B08B 3/02 | 134/122 R |
| 2010/0230253 A1 * | 9/2010 | Fleig | B65G 23/06 | 198/846 |
| 2011/0094856 A1 * | 4/2011 | Guldenfels | F16H 55/30 | 198/495 |

FOREIGN PATENT DOCUMENTS

| | | |
|---|---|---|
| DE | 4003490 A1 | 8/1991 |
| DE | 19824252 C1 | 11/1999 |

\* cited by examiner

BELT DRIVE COMPRISING DRIVING ELEMENTS

TECHNICAL FIELD

The present disclosure relates to a toothed-belt drive with a toothed belt and a toothed disk for driving the toothed belt.

BACKGROUND

Most frequently, toothed belts have a smooth face and a toothed face. Usually, the smooth face is located on the outside whereas the inner face of the toothed belt is provided with the teeth. Here, the toothed belt surrounds the toothed disk, the teeth of the toothed belt engaging tooth recesses of the toothed disk so that the toothed disk drives the toothed belt via the tooth recesses and the teeth.

Toothed-belt drives are often used for transporting items to be transported or moved horizontally. In particular, toothed-belt drives also serve as door drive units for opening and closing vehicle doors, particularly for doors of short and long-distance public transport vehicles.

Often, only one of the toothed disks is driven in a revolving toothed-belt drive, whereas the other, or also several, toothed disks only co-rotate and divert the toothed belt.

The elements to be conveyed or transported are linked to the toothed belt, for example, by drivers. Problems often arise due to the fact that the attachment of the drivers to the toothed belt does not suffice for transmitting large driving forces. The drivers become detached due to load peaks or over the course of operation, which results in maintenance expenditure and costs.

Toothed belts usually consist of plastic material reinforced by longitudinally extending cables or wires. The cables or wires, which are essential to absorbing the tensile forces, must not be damaged by the attachment of the drivers because otherwise, the stability and resistance to tearing of the toothed belt is compromised. This also puts a limit on the transmission of forces by drivers onto elements to be driven or taken along.

Another problem is that a transmission of forces takes place only along the longitudinal extent of the toothed belt, i.e. in the x-direction. Though it is possible to divert the element driven via drivers, for example, by guide rails, this, however, causes a large loss of driving power due to the division of the application of force into an x-component (parallel to the direction of movement of the toothed belt) and a y-component (transverse to the direction of movement of the toothed belt).

This problem arises, for example, in pivot sliding doors, which are displaced parallel and, in some sections, obliquely with respect to the outer vehicle wall and are guided in a curved guide track. Driving takes place via a toothed-belt drive, wherein the door is connected to the toothed belt via a driver. Due to the straight extent of the toothed belt, the driving force is input only in one direction (x-direction), but divided into an x-component and a y-component (transverse to the x-direction) over the course of the movement, due to the curved guide rail. Considerable losses of driving power result from this division.

SUMMARY

The present disclosure avoids the above-mentioned drawbacks of the prior art through an improved toothed-belt drive. In particular, the utilization of the driving power is to be improved, and a permanent and low-maintenance operation of the toothed-belt drive is to be ensured.

According to the disclosure, a toothed-belt drive is provided comprising:
a toothed belt,
at least one driving element attached to the toothed belt,
a toothed disk with tooth recesses for driving teeth of the toothed belt and driving element recesses for driving the at least one driving element,
wherein the driving element forms a connecting element that can be connected to an element to be driven.

The inventive toothed disk with tooth recesses for driving teeth of the toothed belt and driving element recesses for driving the at least one driving element usually does not drive, but merely divert the toothed belt. Within the context of the disclosure, this toothed disk may, however, also be designed as a driving toothed disk. In that case, the drive force from the toothed disk onto the toothed belt or the element to be driven is not only transmitted onto the teeth of the toothed belt, but also onto the at least one driving element, which is in corresponding driving element recesses of the toothed disk.

In particular, several driving elements may jointly move the element to be driven. If several driving elements are located in driving element recesses, also referred to as force absorber recesses, of the toothed disk at the same time, the toothed belt is considerably relieved of load, because the forces are distributed amongst the several driving elements. This is advantageous also due to the fact that, because of the driving elements, also referred to as force absorbers, being guided over the toothed disk, a change of direction may take place from the previously exclusively prevailing directional component into the x-direction. Changes of direction are often accompanied by dynamic load peaks that can be absorbed and compensated by the direct connection of the driving elements with the toothed disk. In this case, the diversion of the direction via the toothed disk may take place by a few degrees up to a complete change of direction by 180°, in accordance with commonly used toothed-belt drive.

In a particularly advantageous embodiment, the driving element is attached to the toothed belt exclusively by clamping. The clamping connection has the crucial advantage that the structure of the toothed belt is not changed by the attachment. In particular, cables or wires within the toothed belt that are essential for tensile strength remain intact.

In order to be able to ensure a clamping connection, the driving element is preferably divided into a top side and a lower side, between which the toothed belt is disposed in the attached state. Here, the lower side is disposed on the toothed side of the toothed belt and, for an improved transmission of forces in the x-direction, may have an inner face which faces the toothed belt and corresponds to the teeth of the toothed belt. For example, the lower part may have a serrated contour in which teeth of the toothed belt come to rest. This results in a frictional-positive connection of the driving element with the toothed belt.

The connection of the top part and the lower part may be effected by any suitable means. It has proved advantageous if the driving element has a length exceeding a width of the toothed belt (transverse to the longitudinal extent). The length of the driving element in the state attached to the toothed belt is disposed transversely to the running direction or longitudinal extent of the toothed belt. Connecting elements, for example screws, connect the top part to the lower part, wherein the screws are disposed laterally of the toothed belt and do not penetrate the latter.

The driving element also forms a connecting element that can be connected to the element to be driven. Preferably, a projecting portion is provided, which can be connected to the driving member or an additional intermediate connecting element. Such a projecting portion may also be formed, for example, by a cylindrical axle stub. An axle stub is particularly suitable because it allows for a pivotable or rotatable connection with the element to be driven or the interposed intermediate connecting element. The pivotability or rotatability between the connecting element and the element to be driven is necessary in order to be able to guide the element to be driven along the circumference of the toothed disk if the latter diverts the driving element. However, the pivotability or rotatability does not necessarily have to be ensured by the driving element or the connecting element itself, a rigid connection at this location is also possible if the pivotability or rotatability between the driving element and the element to be driven is realized at another location.

In a particularly simple embodiment, the driving element is formed as a substantially cylindrical element, wherein a laterally projecting portion over the width of the toothed belt, i.e. an axle stub at the end, serves as a connecting element. In this case, the driving element may have only a single connecting element on one side of the toothed belt, or also two connecting element on both sides of the toothed belt.

According to the disclosure, the transmission of forces onto the element to be driven may be further improved by several driving elements, which are connected to a single element to be driven, being disposed side-by-side on the toothed belt. An additional connecting plate in this case connects the at least two driving elements with each other in such a manner that the tensile forces from one driving element can be transmitted onto the adjacent driving element via the connecting plate. For this purpose, the connecting plate has to be attached to one of the two driving elements so as to be pivotable or rotatable, and preferably has a curved elongated hole into which a force transmitting portion of the adjacent driving element extends. The force transmitting portion may be formed by the connecting element, that is, for example, by an axle stub extending through the curved elongated hole. The curved elongated hole is necessary because a diversion of the toothed belt via the toothed disk would otherwise not be possible.

In order to further improve the transmission of forces onto the element to be driven, an odd number of driving elements may preferably be provided, which are connected to one another via the connecting plate. The connecting plate is attached in a pivotable or rotatable manner to the middle driving element, wherein the force transmitting portions of the adjacent driving elements extend into corresponding curved elongated holes. Only the middle driving element is in this case connected to the element to be driven via its connecting element, so that forces arising are distributed amongst all interconnected driving elements via the connecting plate. For example, groups of three of five driving elements connected to one another via a connecting plate have proved particularly suitable. Advantageously, the tension within the toothed belt does not increase due to the connection of the driving elements with one another in the case of contact with the toothed disk.

The disclosure is explained further with reference to the following figures. The Figures only show preferred features of embodiments and are not to limit the disclosure thereto.

BRIEF DESCRIPTION OF THE DRAWINGS

In the Figures.

DETAILED DESCRIPTION OF THE DRAWINGS

Figure 1:
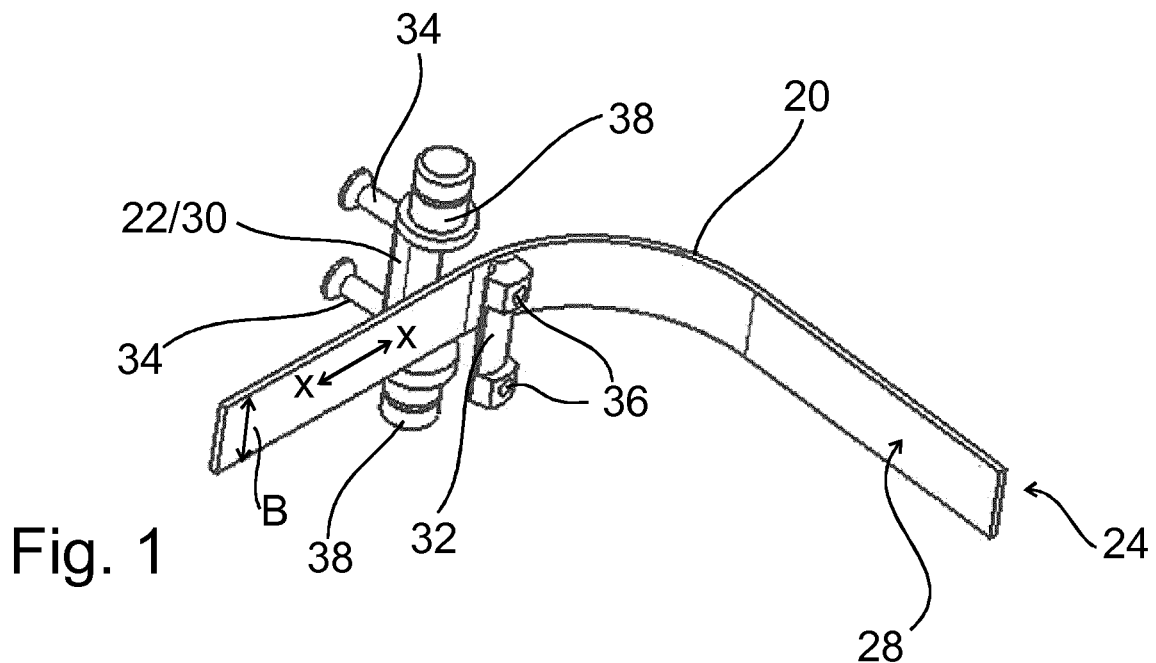
FIG. 1: shows a section of the toothed belt with a driving element according to the disclosure.

FIG. 1 shows a section of a toothed belt 20 to which a driving element 22 according to the disclosure is attached. The toothed belt has an outer face 24 and an inner face 28 facing towards a toothed disk 26 (see FIGS. 3 and 4). The inner face 28 usually has teeth not shown in the Figures.

The driving element 22 is formed by a substantially cylindrically formed body, which is bisected and has a top part 30 and a lower part 32. In the exemplary embodiment shown, the top part 30 and the lower part 32 are connected to each other via connecting means 34, preferably clamping screws, in such a way that the toothed belt 20 is disposed between them. In this case, the lower part 32 is disposed on the inner face 28 and the top part 30 on the outer face 24 of the toothed belt. A serrated inner surface of the lower part 32, which faces towards the teeth of the toothed belt 20 and corresponds to them, is not shown. The teeth come to rest in correspondingly formed depressions of the inner face of the lower part 32 so that a frictional-positive connection of the driving element 22 with the toothed belt 20 is created.

In the exemplary embodiment, the lower part 32 has openings 36 into which the connecting means 34 can be inserted, preferably screwed. The connecting means 38, shown here as clamping screw, extend laterally of the toothed belt 20 and do not penetrate the latter. The driving element 22 has a length exceeding the width B of the toothed belt 20 correspondingly.

Two connecting elements 38, which are configured as axle stubs and, with respect to a width B of the toothed belt, protrude laterally over it, can also be seen. Instead of the two connecting elements 38 that respectively protrude laterally, only a single connecting element 38 may also be provided. The connecting elements 38 constitute an extension of the driving element 22 in its longitudinal direction, so to speak, which, in the attached state, extends parallel to the width of the toothed belt B or transversely to a longitudinal extent X-X of the toothed belt.

Figure 2:
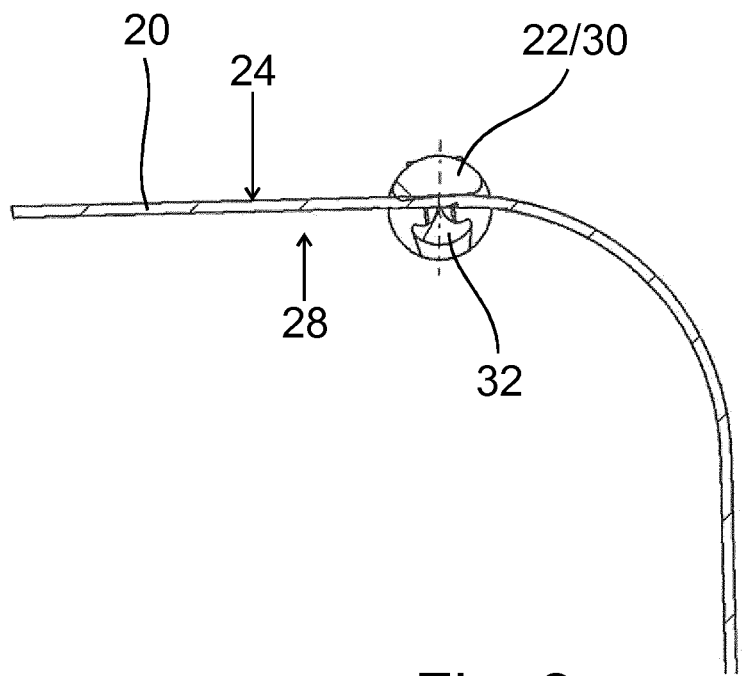
FIG. 2: shows a sectional view of a section of a toothed belt with an attached driving element.

FIG. 2 illustrates the arrangement of the driving element 22 in a sectional view on the toothed belt 20.

Figure 3:
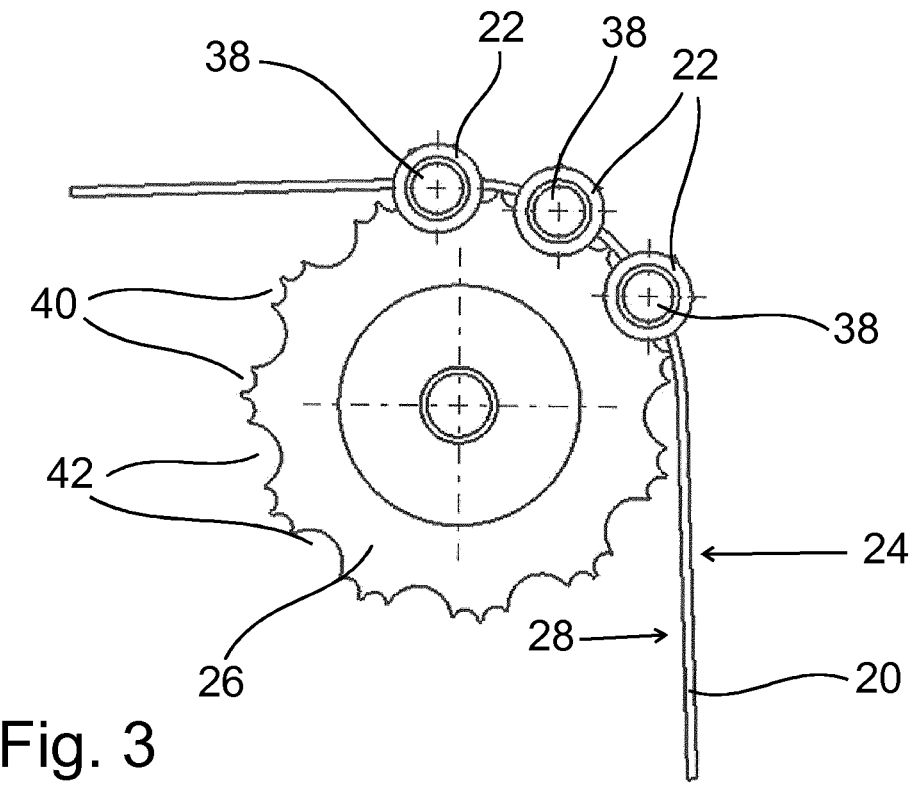
FIG. 3: shows a lateral view of a toothed disk according to the disclosure with a section of the toothed belt and three driving elements.

FIG. 3 shows a preferred embodiment in which three adjacent driving elements 22 are disposed on the toothed belt 20. It is further recognizable that the toothed disk 26 has both tooth recesses 40 for receiving and driving the teeth of the toothed belt 20 and driving element recesses 42 for receiving and driving the driving elements 22. If the toothed disk 26 drives the toothed belt and if the driving elements 22 are located in the driving element recesses 42, the drive force of the toothed disk 26 will be directly transmitted onto the latter.

Figure 4:
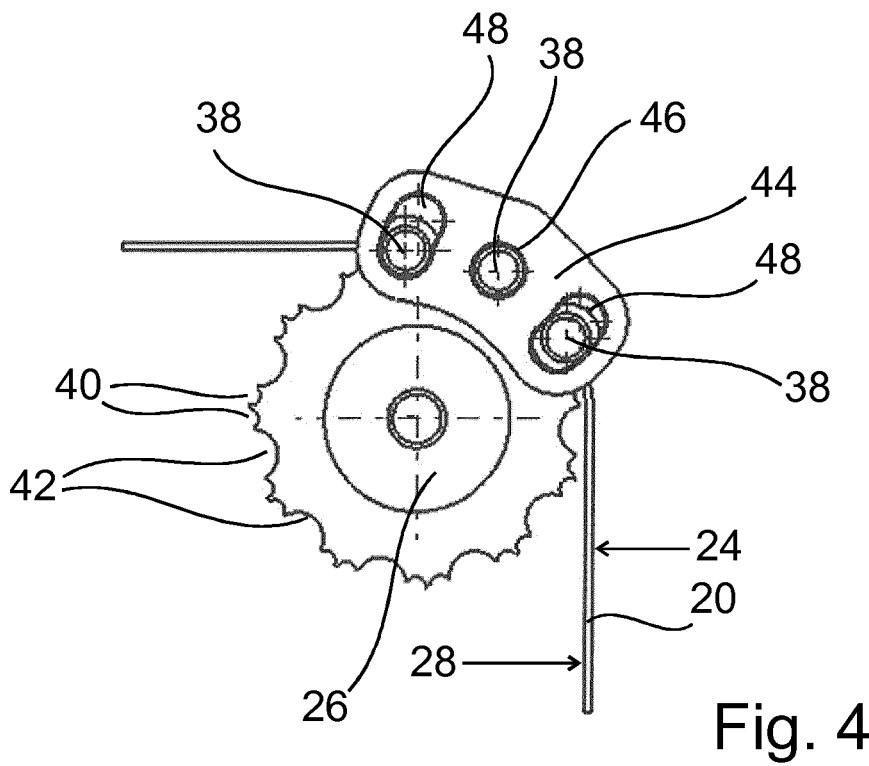
FIG. 4: shows the lateral view according to FIG. 3, additionally with a connecting plate according to the disclosure.

Another advantageous development of the disclosure becomes clear from FIG. 4. It shows a connecting plate 44 connecting the three driving elements 22 with one another in the pulling direction of the toothed belt 20. Here, the connecting plate 44 is pivotably or rotatably mounted on the middle driving element 22. The connecting element 38 configured as an axle stub extends through a circular opening 46 in the connecting plate.

The connecting plate 44 further has two curved elongated holes 48 into which one connecting element 38, respectively, of the adjacent driving element 22 extends. The curved elongated holes 48 enable the connecting plate 44 to be pivoted during the change of direction by means of the toothed disk 26. At the same time, the connecting plate 44 causes forces to be distributed amongst the three driving elements 22 and, at the same time, the tension of the toothed belt 20 to remain unchanged. The connecting element 38 of the middle driving element 22 serves as the sole point of application of load for connection to an element to be driven, which is not shown.

The disclosure is not limited to the above-described exemplary embodiments, but also includes other embodiments covered by the patent claims. In particular, instead of three driving elements 22, more driving elements 22 may also be provided. A bilateral arrangement of connecting plates 44 on the driving elements 22 is also conceivable.

The invention claimed is:

1. A toothed-belt drive comprising:
   a toothed belt,
   at least one driving element attached to the toothed belt,
   a toothed disk with a plurality of tooth recesses for driving teeth of the toothed belt and a plurality of driving element recesses for driving the at least one driving element,
   wherein the driving element forms a connecting element that can be connected to an element to be driven, wherein the driving element is connected to the toothed belt via a clamping connection, wherein the driving element has a length L extending parallel to a width B of the toothed belt in an attached state, which exceeds the width B of the toothed belt, wherein the lower part and the top part are connected to each other via connecting means extending laterally next to the toothed belt; wherein at least two driving elements are provided that are connected to each other via a connecting plate, wherein the connecting plate is pivotably mounted on a first driving element and has a curved elongated hole into which a force transmitting portion of the second driving element extends.

2. The toothed-belt drive according to claim 1, wherein the driving element has a two-part configuration and has a lower part disposed on an inner face of the toothed belt in an attached state, and a top part disposed on an outer face of the toothed belt, which can be connected to each other in such a way that the lower part and the top part clamp the toothed belt between them.

3. The toothed-belt drive according to claim 2, wherein the top part and the lower part are screwed together in the attached state.

4. A toothed-belt drive comprising:
   a toothed belt,
   at least one driving element attached to the toothed belt,
   a toothed disk with a plurality of tooth recesses for driving teeth of the toothed belt and a plurality of driving element recesses for driving the at least one driving element,
   wherein the driving element forms a connecting element that can be connected to an element to be driven, wherein the driving element has, as a connecting element, a cylindrical projecting portion configured as an axle stub, wherein at least two driving elements are provided that are connected to each other via a connecting plate, wherein the connecting plate is pivotably mounted on a first driving element and has a curved elongated hole into which a force transmitting portion of the second driving element extends.

5. The toothed-belt drive according to claim 4, wherein the cylindrical projecting portion forms a free end of the driving element protruding transversely to a longitudinal extent X-X of the toothed belt.

6. The toothed-belt drive according to claim 5, wherein the driving element has two connecting elements that respectively protrude laterally over the width B of the toothed belt at the ends.

7. The toothed-belt drive according to claim 1, wherein at least two driving elements are provided that are connected to each other via a connecting plate.

8. A toothed-belt drive comprising:
   a toothed belt,
   at least one driving element attached to the toothed belt,
   a toothed disk with a plurality of tooth recesses for driving teeth of the toothed belt and a plurality of driving element recesses for driving the at least one driving element,
   wherein the driving element forms a connecting element that can be connected to an element to be driven, wherein at least two driving elements are provided that are connected to each other via a connecting plate, wherein the connecting plate is pivotably mounted on a first driving element and has a curved elongated hole into which a force transmitting portion of the second driving element extends.

9. The toothed-belt drive according to claim 8, wherein an odd number of driving elements are connected to one another via the connecting plate, wherein the middle driving element is pivotably connected to the connecting plate, and force transmitting portions of the adjacent driving elements respectively extend into curved elongated holes of the connecting plate.

10. The toothed-belt drive according to claim 8, wherein connecting elements of the driving elements form the force transmitting portions.

* * * * *